(Model.)
H. SCHMOELE.
BUTTON FASTENER.
No. 272,587.   Patented Feb. 20, 1883.
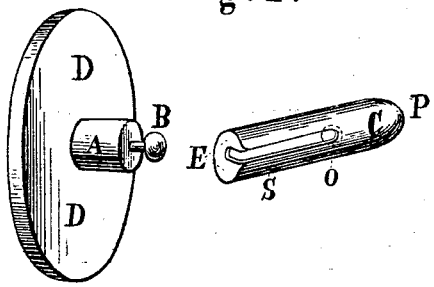
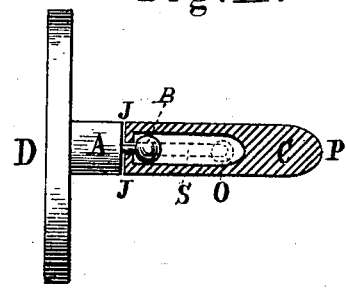
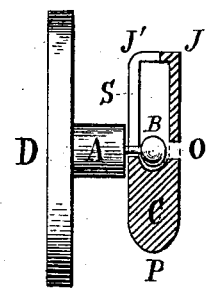
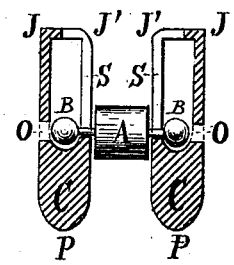
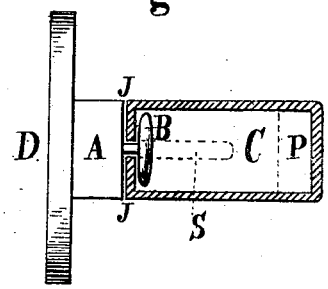
Witnesses.
Charles Schmoele
G. Newton
Inventor.
Henry Schmoele

UNITED STATES PATENT OFFICE.

HENRY SCHMOELE, OF PHILADELPHIA, PENNSYLVANIA.

BUTTON-FASTENER.

SPECIFICATION forming part of Letters Patent No. 272,587, dated February 20, 1883.

Application filed July 3, 1880. (Model.)

*To all whom it may concern:*

Be it known that I, HENRY SCHMOELE, of the city of Philadelphia, State of Pennsylvania, have invented a Shank or Fastener to be Attached to Disks, &c., to form Buttons, Paper-Fasteners, &c., of which the following is a specification.

The object of my invention is to form a shank for a button, or its equivalent, capable of being readily inserted through eyelets, button-holes, or through fabrics themselves, easily locked, and also as readily unlocked and withdrawn.

Figure I shows a perspective view of a cylindrical shank fastened to a disk, with the movable piece separate. Fig. II shows a section of a shank in the unlocked position. Fig. III shows a section of a shank in the locked position. Fig. IV shows a section of two shanks united. Fig. V shows a section of an oblong shank for button-holes, with hollow movable piece.

The shank is composed of a fixed and a movable piece. The free end of the fixed piece A terminates in a knob or ball, B, Fig. I. The other end of the fixed piece A is fastened to a disk, D, or its equivalent. The diameter of the piece C is equal to that of A. The piece C has a groove, with a slot, S, therein, extending a trifle over half its length. The knob B fits and traverses the groove, and the neck of the knob fits and traverses the slot S. The groove is closed by the piece E, which can either be formed separately and fastened at the mouth of the groove, or by bending down portions of the walls of the piece C. The slot S must, however, be continued a distance through E sufficient to allow C to turn upon B, so that the longitudinal axes of A and C shall be in line and continuous when the shank is in the unlocked position. When B is made spherical, the groove is easily made by drilling C. The groove, as well as the slot, could extend nearly the full length of C; but it is preferable, by being stronger, to make them extend only a trifle beyond the center of the length of C, so that in the locked position B will be in the center of C.

For eyelets the shank should be made cylindrical and the knob spherical, the groove as large in diameter as strength will permit.

The corners J' must be somewhat rounded to allow C to turn on B.

For button-holes, A is best made oblong, as in Fig. V, to prevent turning. In the unlocked position the movable piece should make a continuation of the fixed piece, and follow its form and diameter and have no projections. The shape of B may vary, being either spherical, as in Fig. I, or flattened and elongated, as in Fig. V, or their equivalents. C can also be hollow, as in Fig. V, and the point P, which in Fig. I is shown as a reduction of that end of C, can be formed by bending in the walls of C equally from each side of its length, starting the bend, say, at the dotted line between C and P in Fig. V.

The proportions of the several parts vary with the sizes and uses of the buttons or fasteners to which they are attached.

The shank can be fastened to the disk by any of the ordinary methods.

In order to facilitate the entrance of the shank through the eyelets, button-holes, &c., the free end of the movable piece C is tapered like P. The taper can be more or less rapid, as desired. When the shank is to penetrate fabrics without eyelets or openings, the point P should be sharp, to facilitate insertion. The shank of B should be short and the joint at J J as close as possible when A and C are in line or in the unlocked position.

A fastener may be composed of two shanks united, as in Fig. IV.

In order to prevent C from sliding upon B when the shank is in the locked position, and to keep it there, an opening, O, of less diameter than B, is made through the walls of C into the groove, and a tap given by a hammer to slightly depress the inner circumference of O into the groove. The result is that the walls of C at the circumference of O, in projecting farther into the groove, offer a trifle more resistance to B in its passage past them, but cease to impinge with greater force as soon as B is moved under O. B will consequently remain under O, or locked, until increased force is used to overcome the resistance in the groove offered by the depression of the inner circumference of O. When the knob fits the groove accurately, this precaution for keeping C in position is unnecessary; but when shanks are to be made, or when partly worn out, use can be made of the opening O for keeping the movable piece C in the locked position.

The combination of the grooved and slotted shoe or fastening device with the knobbed shank, so as to form a ball-and-socket joint, gives the important advantage of allowing the fastening and the fastened parts to be free to swivel and flex upon each other independently, and thus allow the fastened parts to yield when caught or rubbed by the garments, and greatly lessen the danger of breaking off the slender neck-connection of the knob. The fastener can penetrate and bind together materials not provided with button-holes.

The construction of the shoe device with a groove to receive the shank-knob and with the slot to receive the slender neck of the knob gives the capacity for a sliding movement to place the shoe device upon and remove it from the knob and a capacity for its universal adjustment upon the knob when properly set to secure the button, so that while the connection is made secure the joint will be free to flex in every direction, and each connected part will yield to any pressure or contact, and thus relieve the neck of the knob.

I claim as my invention—

1. The combination, substantially as herein described, of a button-shank, A, provided with a knob, B, joining the shank by a cylindrical neck, with a fastening piece or shoe, C, having an interior groove or space and a side slot, S, adapted to receive said knob and its neck and allow the fastened parts to be free to swivel and flex upon each other and independently of each other in their fastened relation.

2. The cylindrical fastening piece or shoe C, having a longitudinal interior groove of cylindrical form in cross-section, and a side slot, S, in combination with a button having a shank provided with a spherical knob, B, joining the shank by a cylindrical neck, substantially as described, for the purpose specified.

3. The fastening piece or shoe C, pointed at one end, open and rounded at J' at the other, having an interior groove or space and a side slot, S, and combined with a button having a shank provided with a knob and a cylindrical neck, all constructed substantially as shown and specified.

HENRY SCHMOELE.

Witnesses:
B. F. MOORE,
THOS. J. MURRAY.